(12) United States Patent
Tamanuki et al.

(10) Patent No.: US 7,338,218 B2
(45) Date of Patent: Mar. 4, 2008

(54) OPTICAL MODULE, METHOD OF MANUFACTURING THE OPTICAL MODULE, AND DATA COMMUNICATION SYSTEM INCLUDING THE OPTICAL MODULE

(75) Inventors: Takemasa Tamanuki, Torrance, CA (US); Chris Keller, Torrance, CA (US)

(73) Assignee: Ibiden Co., Ltd., Ogaki-Shi (JP)

( * ) Notice: Subject to any disclaimer, the term of this patent is extended or adjusted under 35 U.S.C. 154(b) by 292 days.

(21) Appl. No.: 11/046,875

(22) Filed: Feb. 1, 2005

(65) Prior Publication Data
US 2006/0171642 A1 Aug. 3, 2006

(51) Int. Cl.
*G02B 6/36* (2006.01)

(52) U.S. Cl. .................. 385/89; 385/88; 385/90; 385/92

(58) Field of Classification Search .......... 385/39, 385/51–52, 49, 88–90, 92
See application file for complete search history.

(56) References Cited

U.S. PATENT DOCUMENTS

| 4,732,446 | A |   | 3/1988  | Gipson et al.           |
|-----------|---|---|---------|-------------------------|
| 4,966,430 | A |   | 10/1990 | Weidel                  |
| 5,412,748 | A | * | 5/1995  | Furuyama et al. ... 385/92 |
| 5,535,296 | A |   | 7/1996  | Uchida                  |
| 5,687,267 | A |   | 11/1997 | Uchida                  |
| 5,883,988 | A | * | 3/1999  | Yamamoto et al. ... 385/14 |
| 5,949,932 | A | * | 9/1999  | Lawrenz-Stolz ... 385/33 |
| 5,974,064 | A |   | 10/1999 | Uchida                  |
| 6,330,377 | B1|   | 12/2001 | Kosemura                |
| 6,457,875 | B1|   | 10/2002 | Kropp et al.            |
| 6,595,699 | B1| * | 7/2003  | Nguyen et al. ... 385/88 |
| 6,625,369 | B1|   | 9/2003  | Fröjdh                  |
| 6,712,527 | B1|   | 3/2004  | Chan et al.             |

(Continued)

FOREIGN PATENT DOCUMENTS

EP 0 320 722 A2 6/1989

(Continued)

OTHER PUBLICATIONS

Al Yuen, et al., "Parallel Optical Links for Gigabyte/s Data Communication", Gallium Arsenide Integrated Circuit (GAASIC) Symposium, XP-010251656, Oct. 12, 1997, pp. 193-196.

(Continued)

*Primary Examiner*—Frank G. Font
*Assistant Examiner*—Michael P. Mooney
(74) *Attorney, Agent, or Firm*—Oblon, Spivak, McClelland, Maier & Neustadt, P.C.

(57) ABSTRACT

An optical module includes a fiber array, a laser diode array and a photodiode array. The fiber array has optical fibers which are divided to a transmitter group and a receiver group. The laser diode array has laser diodes which are grouped in a transmitter group. The photodiode array has photodiodes which are divided to a monitor group and a receiver group. The laser diode array is provided between the fiber array and the photodiode array. Each optical fiber of the transmitter group, each laser diode of the transmitter group and each photodiode of the monitor group are optically aligned, respectively. Each optical fiber of the receiver group is optically aligned with each photodiode of the receiver group, respectively.

11 Claims, 13 Drawing Sheets

U.S. PATENT DOCUMENTS

| | | |
|---|---|---|
| 6,736,553 B1 | 5/2004 | Stiehl et al. |
| 6,905,257 B2 | 6/2005 | Eichenberger et al. |
| 2002/0114590 A1 | 8/2002 | Eichenberger et al. |
| 2003/0113073 A1 | 6/2003 | Cheng |
| 2003/0169981 A1 | 9/2003 | Nakanishi et al. |
| 2003/0180012 A1 | 9/2003 | Deane et al. |
| 2004/0136651 A1* | 7/2004 | Yee et al. .................... 385/33 |

FOREIGN PATENT DOCUMENTS

| | | |
|---|---|---|
| EP | 0 704 732 A1 | 4/1996 |
| EP | 0 745 873 A2 | 12/1996 |
| EP | 0 807 981 A2 | 11/1997 |
| EP | 1 143 278 A2 | 10/2001 |
| EP | 1 237 026 A2 | 9/2002 |
| EP | 1 053 575 B1 | 9/2004 |
| JP | 8-179171 | 7/1996 |
| JP | 2001-141969 | 5/2001 |
| JP | 2002-511658 | 4/2002 |
| JP | 2002-311310 | 10/2002 |
| WO | WO 99/53577 | 10/1999 |

OTHER PUBLICATIONS

Takemasa Tamanuki, et al., "High Density Packaged 4-channel Transceiver for Metro and Access Applications", Electronic Components and Technology Conference, XP-010808788, May 31, 2005, pp. 1050-1057.

* cited by examiner

OPTICAL MODULE, METHOD OF MANUFACTURING THE OPTICAL MODULE, AND DATA COMMUNICATION SYSTEM INCLUDING THE OPTICAL MODULE

BACKGROUND OF THE INVENTION

1. Field of the Invention

The present invention relates to an optical module, a method of manufacturing the optical module, and a data communication system including the optical module.

2. Discussion of the Background

U. S. Patent Application Publication No. US2002/0114590 A1 discloses an optical interface for a 4-channel opto-electronic transmitter-receiver module. The optical interface for the 4-channel opto-electronic transmitter-receiver module includes a module housing, a transmitter chip, a receiver chip and an adapter unit. The module housing includes at least one housing wall, and is provided with a wall opening in the housing wall. The transmitter chip includes a 4-channel laser diode array, and the receiver chip includes a 4-channel photodetector array. The transmitter chip and the receiver chip are mounted in the wall opening. The adapter unit includes eight optical fibers, each of which has a proximal fiber end and an opposite fiber end.

Proximal fiber ends of the optical fibers are grouped in two fiber end arrays. Each of the two fiber end arrays is supported in optical alignment with a corresponding one of the 4-channel laser diode array and the 4-channel photodetector array. Each of the two fiber end arrays includes four fiber ends evenly spaced apart from each other. The two fiber end arrays are spaced apart from each other by a distance greater than spacing between adjacent optical fibers in each of the two fiber end arrays.

SUMMARY OF THE INVENTION

According to one aspect of the present invention, an optical module includes a fiber array, a laser diode array and a photodiode array. The fiber array has optical fibers which are divided to a transmitter group and a receiver group. The laser diode array has laser diodes which are grouped in a transmitter group. The photodiode array has photodiodes which are divided to a monitor group and a receiver group. The laser diode array is provided between the fiber array and the photodiode array such that each end surface of the optical fibers of the transmitter group faces each laser diode of the transmitter group. Each optical fiber of the transmitter group, each laser diode of the transmitter group and each photodiode of the monitor group are optically aligned, respectively. Each optical fiber of the receiver group is optically aligned with each photodiode of the receiver group, respectively.

According to another aspect of the present invention, a method of manufacturing an optical module includes positioning a laser diode submount, which is provided with a laser diode array, onto a bridge, which is provided with a terminal block, and connecting one end of a laser diode lead wire to the laser diode array and another end of the laser diode lead wire to a bonding pad of the terminal block. In this method, each optical fiber of a transmitter group of a fiber array is optically aligned with each corresponding laser diode of a transmitter group. Then, the fiber array is connected to the laser diode submount. Each optical fiber of a transmitter group and a receiver group of a mechanical transfer ferrule is optically aligned with each corresponding photodiode of a monitor group and a receiver group of a photodiode array which is provided on a photodiode submount. Then, the mechanical transfer ferrule is connected to the photodiode submount. The fiber array, which is connected with the laser diode submount provided with the laser diode array, is connected with the mechanical transfer ferrule, which is connected with the photodiode submount provided with the photodiode array, using a guide pin such that each optical fiber of the transmitter group of the fiber array, each laser diode of the transmitter group, each optical fiber of the transmitter group of the mechanical transfer ferrule and each photodiode of the monitor group are optically aligned, respectively, and such that each optical fiber of a receiver group of the fiber array, each optical fiber of the receiver group of the mechanical transfer ferrule and each photodiode of the receiver group are optically aligned, respectively.

According to yet another aspect of the present invention, a data communication system includes an optical module which has a fiber array, a laser diode array and a photodiode array. The fiber array has optical fibers which are divided to a transmitter group and a receiver group. The laser diode array has laser diodes which are grouped in at least a transmitter group. The photodiode array has plural photodiodes which are divided to a monitor group and a receiver group. The laser diode array is provided between the fiber array and the photodiode array such that each end surface of the optical fibers of the transmitter group faces each laser diode of the transmitter group. Each optical fiber of the transmitter group, each laser diode of the transmitter group and each photodiode of the monitor group are optically aligned, respectively. Each optical fiber of the receiver group is optically aligned with each photodiode of the receiver group, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
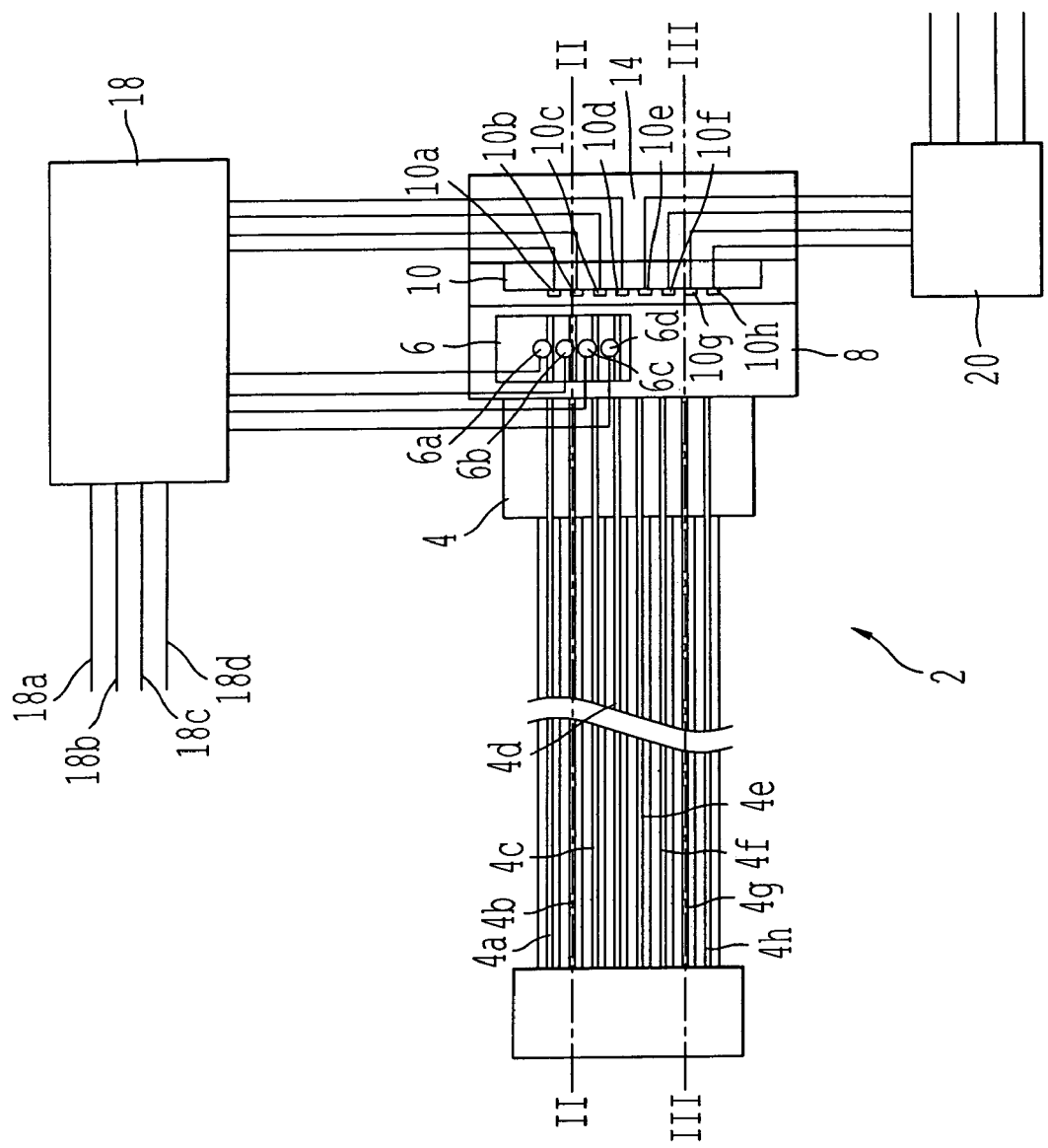
FIG. 1 is a top plan view of an optical module according to an embodiment of the present invention.

The embodiments will now be described with reference to the accompanying drawings, wherein like reference numerals designate corresponding or identical elements throughout the various drawings.

Figure 2:
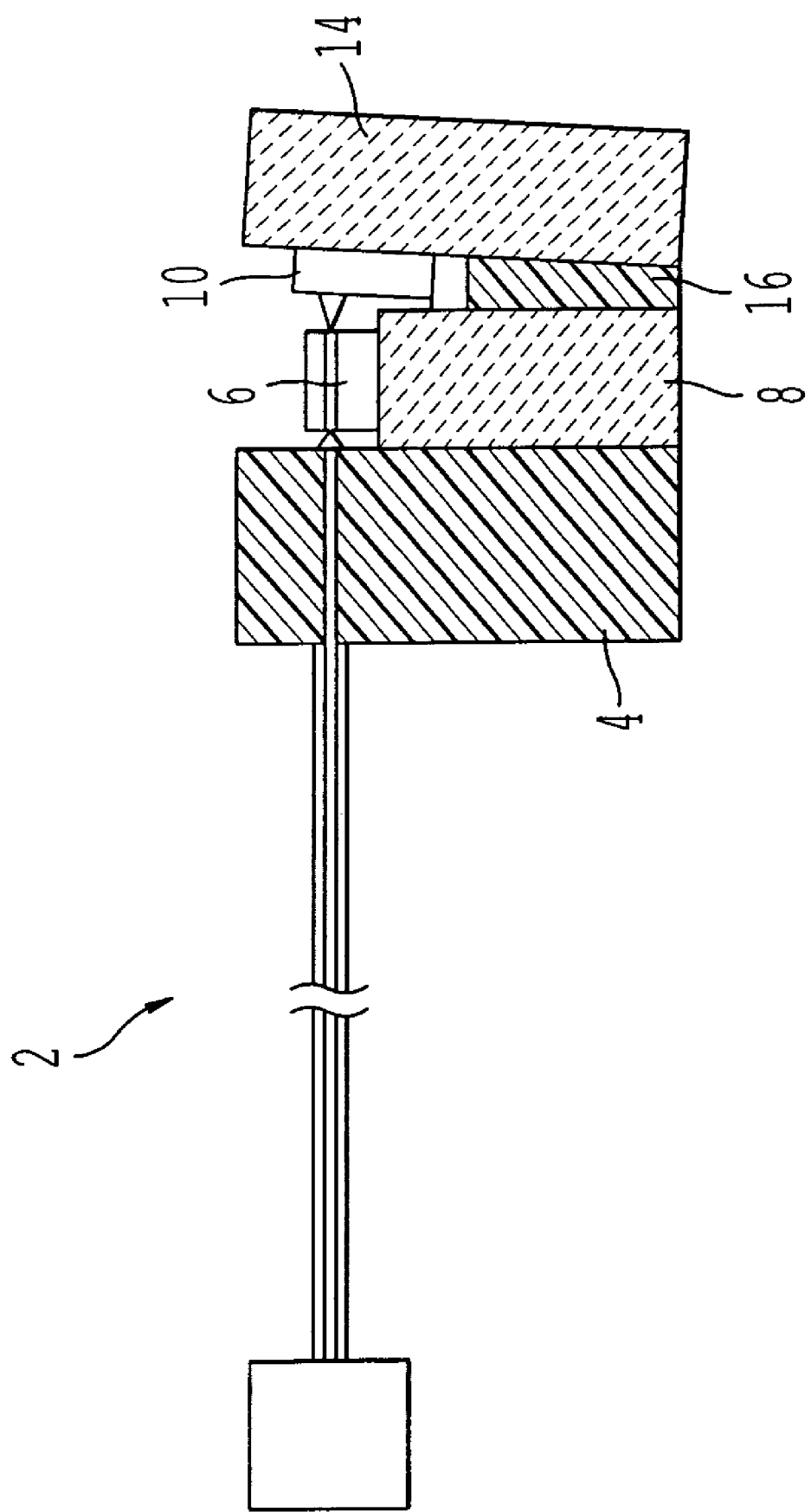
FIG. 2 is a cross sectional view of the optical module cut along the line II-II of FIG. 1.
Figure 3:
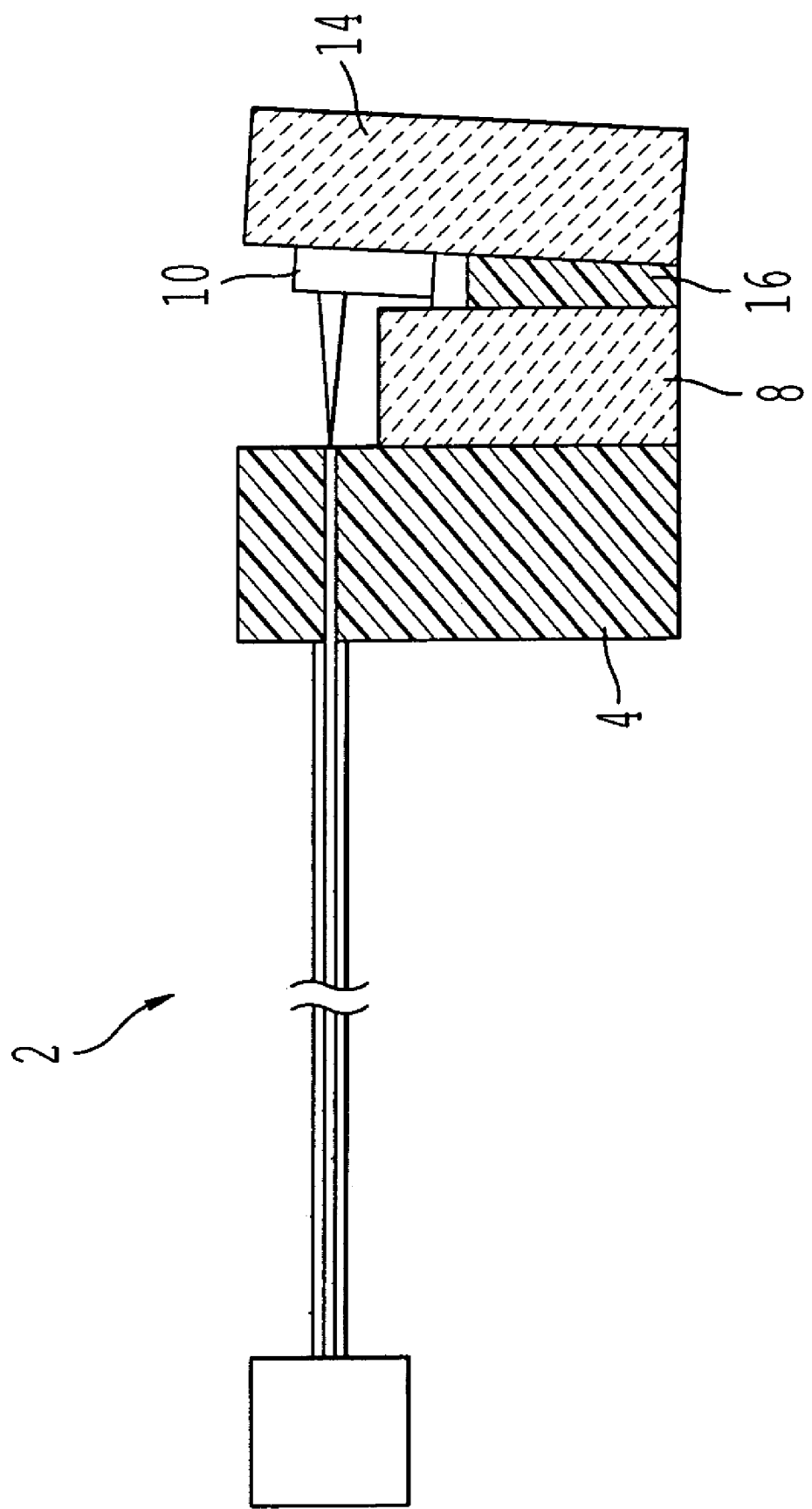
FIG. 3 is a cross sectional view of the optical module cut along the line III-III of FIG. 1.

FIGS. 1-3 show an optical module according to an embodiment of the present invention. Referring to FIGS. 1-3, the optical module 2 includes, a multi-channel, for example, 8-channel fiber array 4, a multi-channel, for example, 4-channel laser diode array 6, a laser diode submount 8, a multi-channel, for example, 8-channel photodiode array 10, and a photodiode submount 14.

The laser diode array 6 is bonded on the laser diode submount 8. The photodiode array 10 is bonded to the photodiode submount 14. The fiber array 4 and the photodiode submount 14 are connected to sandwich the laser diode submount 8. A spacer 16 is provided between the photodiode submount 14 and the laser diode submount 8 to tilt the photodiode array, with a predetermined angle, away from the fiber array 4 to reduce unwanted back reflection, caused by the photodiode array 10, into optical fibers of the fiber array. The spacer 16 has a thickness of, for example, about 200 μm and is made of, for example, a resin material. The phrase "about 200 μm" includes reasonable measuring margins of error accepted by persons skilled in the art. This use of "about" is applicable throughout this specification.

The fiber array 4 includes eight optical fibers 4a-4h extending through the fiber array 4. The fiber array 4 is divided to a transmitter group which includes first to fourth optical fibers 4a-4d, and a receiver group which includes fifth to eighth optical fibers 4e-4h. The laser diode array 6 includes first to fourth laser diodes 6a-6d which are grouped together as a transmitter group. The photodiode array 10 includes eight photodiodes which are divided to a monitor group including first to fourth photodiodes 10a-10d and a receiver group including fifth to eighth photodiodes 10e-10h.

The fiber array 4, the laser diode array 6, and the photodiode array 10 are arranged such that the first to fourth optical fibers 4a-4d of the transmitter group, the first to fourth laser diodes 6a-6d of the transmitter group and the first to fourth photodiodes 10a-10d of the monitor group are optically aligned, respectively, and the fifth to eighth optical fibers 4e-4h of the receiver group and the fifth to eighth photodiodes 10e-10h of the receiver group are optically aligned, respectively.

A distance between each of end surfaces of the optical fibers 4a-4d of the transmitter group and each corresponding one of the laser diodes 6a-6d of the transmitter group is at least about 10 μm and at most about 50 μm, preferably at least about 20 μm and at most about 30 μm. A distance between each of the laser diodes 6a-6d of the transmitter group and each corresponding one of the photodiodes 10a-10d of the monitor group is at least about 20 μm at most about 100 μm. A distance between each of end surfaces of the optical fibers 4e-4h of the receiver group and each corresponding one of the photodiodes 10e-10h of the receiver group is at least about 170 μm and at most about 500 μm.

According to this embodiment of the present invention, the eight optical fibers 4a-4h, the four laser diodes 6a-6d and the eight photodiodes 10a-10h have substantially equal pitches which are at least about 125 μm. In addition, a combined number of the optical fibers of the transmitter group and the receiver group of the fiber array 4 is eight, which is equal to a combined number of the photodiodes of the monitor group and the receiver group, and twice a number of the laser diodes of the transmitter group. Moreover, the eight optical fibers 4a-4h of the fiber array are equally divided to the transmitter group and the receiver group, and the eight photodiodes 10a-10h are equally divided to the transmitter group and the receiver group.

However, the pitches between the optical fibers 4a-4h, the laser diodes 6a-6d and the photodiodes 10a-10h may be arranged such that, for example, a pitch within one group of the fiber array 4 is different from a pitch within another group of the fiber array 4, or a pitch between the transmitter group and the receiver group of the fiber array 4 is different from a pitch within the transmitter group and the receiver group of the fiber array.

Further, the fiber array 4 may have any plural number of optical fibers and may be divided to more groups than the transmitter group and the receiver group. The photodiode array 10 may have any plural number of photodiodes and may be divided to more groups than the monitor group and the receiver group. The optical fibers and the photodiodes may be divided to plural groups unevenly, as long as each optical fiber of the transmitter group, each corresponding laser diode of the transmitter group and each corresponding photodiode of the monitor group can be optically aligned, respectively, and as long as each optical fiber of the receiver group can be optically aligned with each corresponding photodiode of the receiver group. A group or groups other than the transmitter group and the receiver group of the fiber array 4 may have one or more functions different from either or both the transmitter group and the receiver group of the fiber array 4, and a group or groups other than the monitor group and the receiver group of the photodiode array 10 may have one or more 3 functions different from either or both the monitor group and the receiver group of the photodiode array 10.

Similarly, the laser diode array 6 may have one laser diode or any plural number of laser diodes. The laser diode array 6 may be divided to more groups than the transmitter group, and may be divided to plural groups unevenly, as long as each optical fiber of the transmitter group, each corresponding laser diode of the transmitter group and each corresponding photodiode of the monitor group can be optically aligned, respectively. A group or groups of the laser diode array 6 other than the transmitter group may have one or more functions different from the transmitter group of the laser diode array 6.

Moreover, according to this embodiment of the present invention, the transmitter group and the receiver group of the fiber array 4 are adjacent to each other, and the monitor group and the receiver group of the photodiode array 10 are adjacent to each other. In addition, the fiber array 4 and the photodiode array 10 each have a single tier including a first part and a second part. In the fiber array 4, the optical fibers 4a-4d of the transmitter group are in the first part, and the optical fibers 4e-4h of the receiver group are in the second part. In the photodiode array 10, the photodiodes 10a-10d of the monitor group are in the first part, and the photodiodes 10e-10h of the receiver group are in the second part.

However, one or more optical fibers or one or more different components of the optical module may be provided between the transmitter group and the receiver group of the fiber array 4. Consequently, the photodiode array 10 may have one or more photodiodes or one or more different components of the optical module between the monitor group and the receiver group. The monitor group and the receiver group of the photodiode array 10 may be simply spaced a part in order to be in optical alignment with the fiber array 4. Further, the first part of the fiber array 4 and the first part of the photodiode array 10 may be either side of the second part of the fiber array 4 and the second part of the photodiode array 10, as long as the transmitter group and the receiver group of the fiber array 4 are optically aligned with the monitor group and the receiver group of the photodiode array 10, respectively.

According to this embodiment of the present invention, a transmitter circuit 18 is connected to the laser diode 6a-6d of the transmitter group and to the photodiodes 10a-10d of the monitor group. A receiver circuit 20 is connected to the photodiodes 10e-10h of the receiver group. The transmitter circuit 18 controls the laser diodes 6a-6d to emit optical signals according to electrical signals to be transmitted being input to the transmit circuit 18 via signal input lines 18a-18d. The photodiodes 10a-10d of the monitor group receive optical signals emitted from the laser diodes 6a-6d of the transmitter group, and output received optical signals to the transmitter circuit 18 to perform feed back control of the laser diodes 6a-6d. The photodiodes 10e-10h of the receiver group receive optical signals transmitted via the optical fibers 4e-4h of the receiver group, convert received optical signals to electrical signals, and output the electrical signals to the receiver circuit 20.

According to this embodiment of the present invention, the pitches of the optical fibers 4a-4h of the fiber array 4, the laser diodes 6a-6d of the laser diode array 6 and the photodiodes 10a-10h of the photodiode array 10 are substantially equal. In addition, on a single substrate of the photodiode array 10, the photodiodes 10a-10d of the monitor group and the photodiodes 10e-10h of the receiver group can be positioned together, and perform functions of both independent monitoring of the optical output power of each of the laser diodes 6a-6d of the transmitter group, and receiving optical signals from the optical fibers 4e-4h of the receiver group.

As a result, for transmitting and receiving optical signals, the optical module according to this embodiment of the present invention can increase, within limited space, a number of channels which are provided with optical output power monitors. Moreover, according to this embodiment of the present invention, structures of an optical module can be simplified, and manufacturing cost of an optical module can be reduced.

Figure 4:
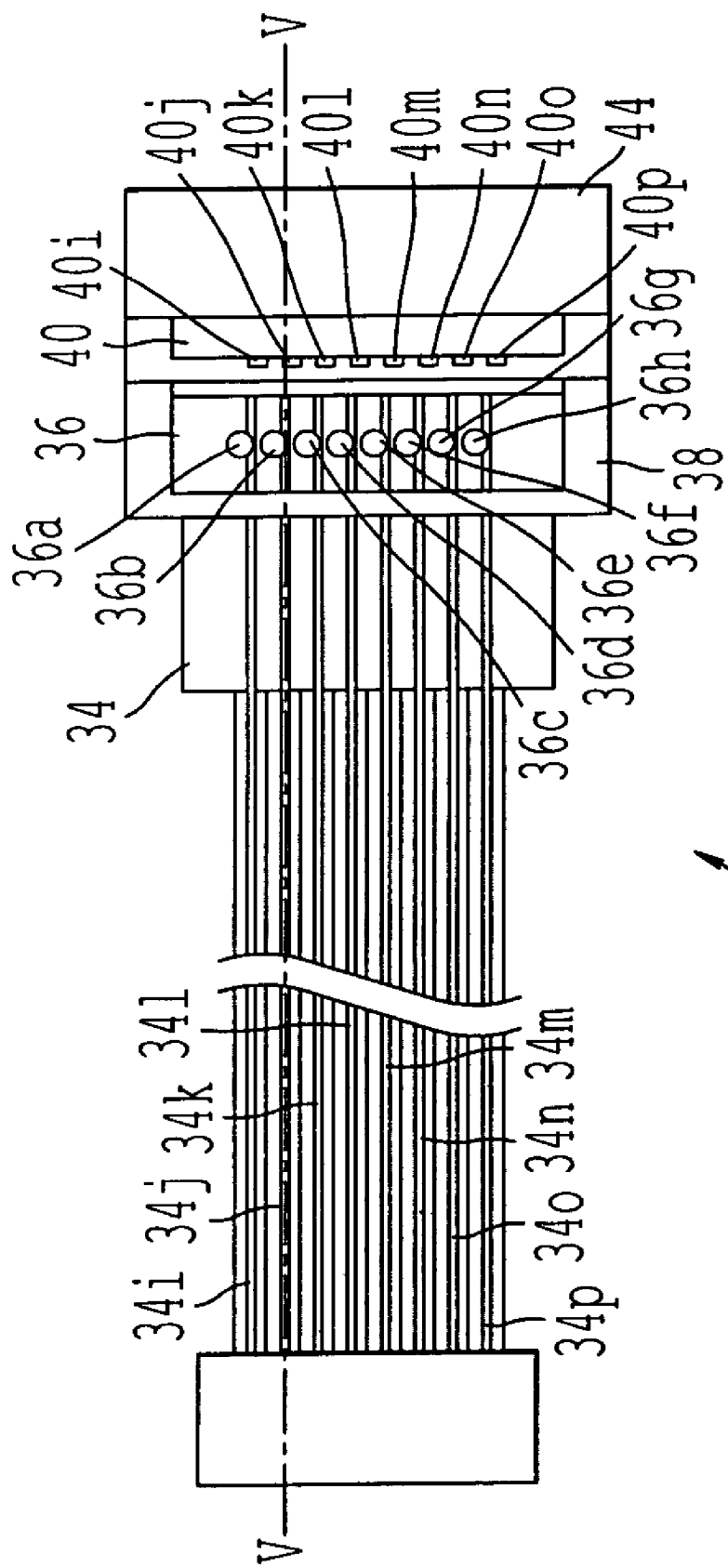
FIG. 4 is a top plan view of an optical module according to an embodiment of the present invention.
Figure 5:
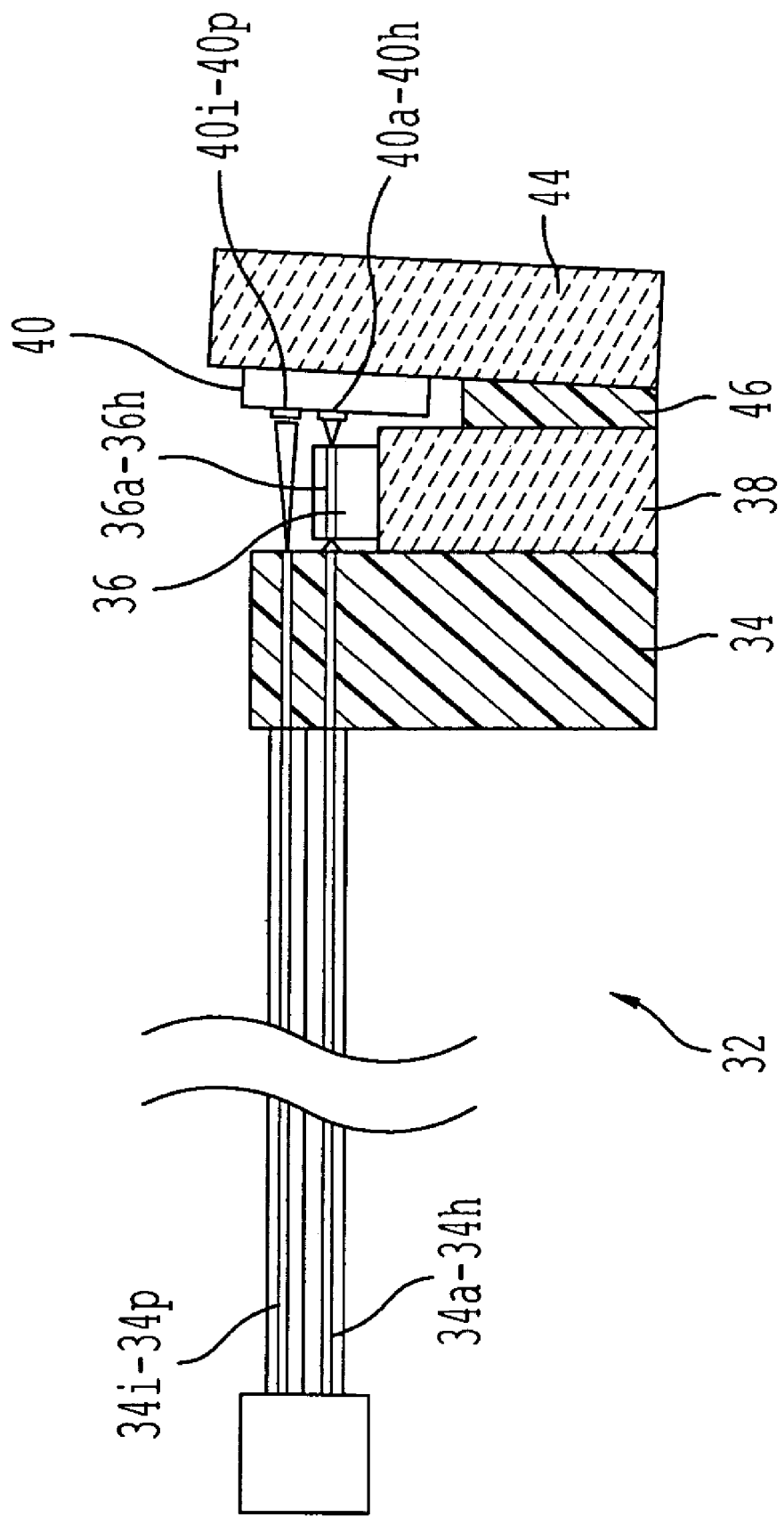
FIG. 5 is a cross sectional view of the optical module cut along the line V-V of FIG. 4.
Figure 6:
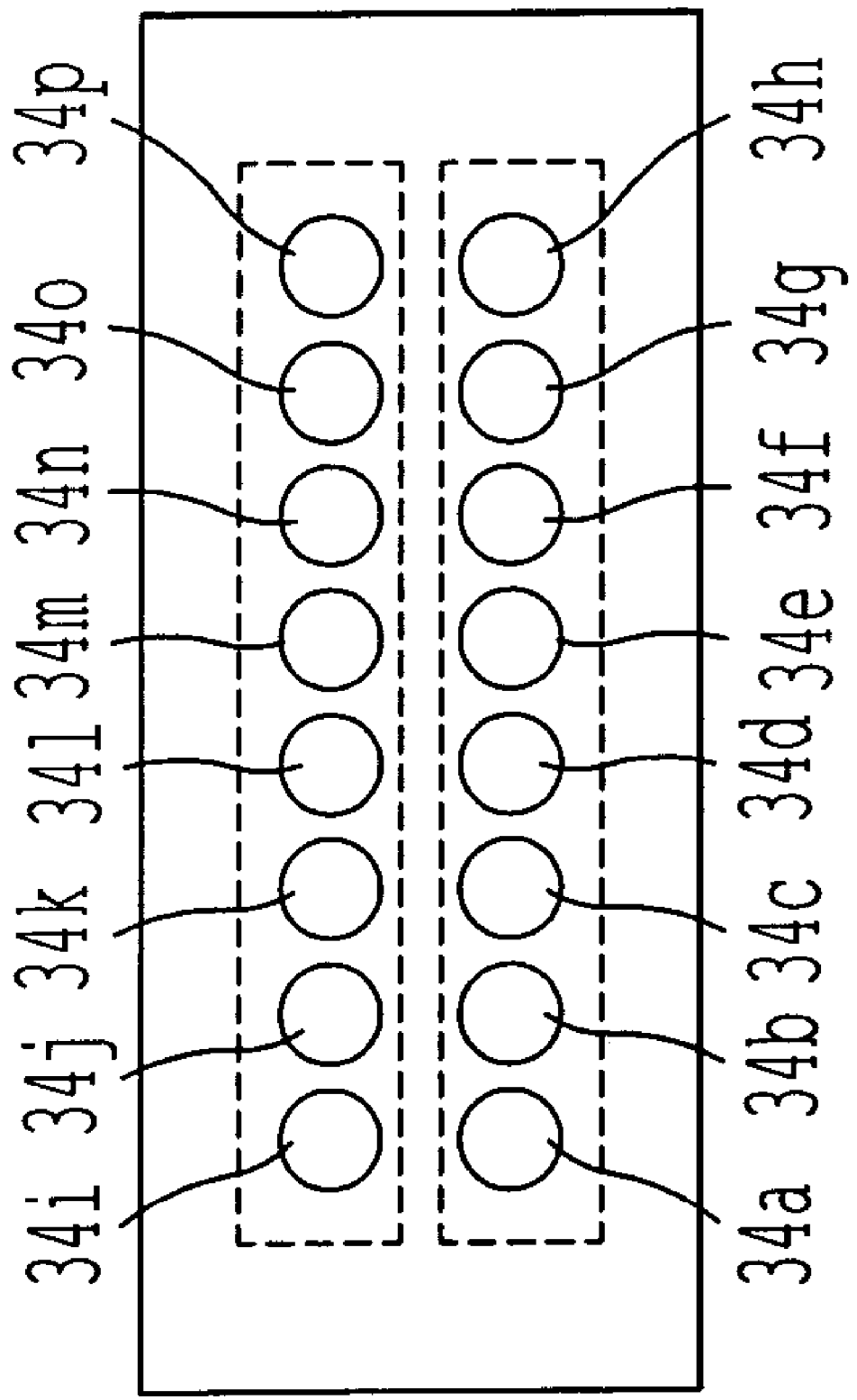
FIG. 6 is an end view of the optical module in FIG. 4.

FIGS. 4-6 show an optical module according to an embodiment of the present invention which includes a two tiered multi-channel fiber array and a two tiered multi-channel photodiode array. Referring to FIGS. 4-6, the optical module 32 includes, a two tiered multi-channel, for example, 16-channel fiber array 34, a multi-channel, for example, 8-channel laser diode array 36, a laser diode submount 38, a two tiered multi-channel, for example, 16-channel photodiode array 40, and a photodiode submount 44.

The two tiered fiber array 34 is provided with a first tier and a second tier. First to eighth optical fibers 34a-34h in the first tier are in a transmitter group, and ninth to sixteenth optical fibers 34i-34p in the second tier are in a receiver group. The laser diode array 36 includes first to eighth laser diodes 36a-36h grouped as a transmitter group. The two tiered photodiode array 40 is provided with a first tier and a second tier. First to eighth photodiodes 40a-40h in the first tier are in a monitor group, and ninth to sixteenth photodiodes 40i-40p in the second tier are in a receiver group.

Pitches between each optical fiber of the first tier and each optical fiber of the second tier directly above the each optical fiber of the first tier, for example, between an optical fiber 34a and an optical fiber 34i, between each photodiode of the first tier and each photodiode of the second tier directly above the each photodiode of the first tier, between eight optical fibers of each of the transmitter group and the receiver group of the fiber array, between eight laser diodes of the transmitter group of the laser diode array, and between eight photodiodes of each of the monitor group and the receiver group of the photodiode array are substantially equal, and at least about 125 μm.

The fiber array 34, the laser diode array 36 and the photodiode array 40 are arranged such that the first to eighth optical fibers 34a-34h of the transmitter group, the first to eighth laser diodes 36a-36h of the transmitter group and the first to eighth photodiodes 40a-40h of the monitor group are optically aligned, respectively, and the ninth to sixteenth optical fibers 34i-34p of the receiver group and the ninth to sixteenth photodiodes 40i-40p of the receiver group are optically aligned, respectively. Each of the first to eighth photodiodes 40a-40h of the monitor group in the first tier receives optical output power of each of the first to eighth laser diodes 36a-36h of the transmitter group, respectively, and each of the ninth to sixteenth photodiodes 40i-40p of the receiver group in the second tier receives optical signals from each of the optical fibers 34i-34p of the receiver group, respectively.

According to this embodiment of the present invention, the first tier and the second tier of the fiber array are in a lower tier and an upper tier, respectively, and are adjacent to each other. The first tier and the second tier of the photodiode array are in a lower tier and an upper tier, respectively, and are adjacent to each other. However, the first tier may be upper in relation to the second tier in the fiber array and the photodiode array. In addition, one or more tiers of optical fibers or photodiodes, or one or more of other components of the optical module may be provided between the first tier and the second tier in either or both the fiber array and the photodiode array. Further, the laser diode array may have one or more groups in one or more tiers other than a tier of the transmitter group, as long as each optical fiber of the transmitter group, each corresponding laser diode of the transmitter group and each corresponding photodiode of the monitor group can be optically aligned, respectively, and as long as each optical fiber of the receiver group can be optically aligned with each corresponding photodiode of the receiver group.

Moreover, the fiber array and the photodiode array may have any plural optical fibers and any plural photodiodes, respectively, and may be divided, evenly or unevenly, to plural groups in plural tiers. The laser diode array may have one or more laser diodes, and may be grouped, evenly or unevenly, in one or more groups in one or more tiers, as long as the optical fibers of the transmitter group, the laser diodes of the transmitter group, the photodiodes of the monitor group are optically aligned, respectively, and the optical fibers of the receiver group and the photodiodes of the receiver group are optically aligned, respectively.

According to this embodiment of the present invention, the fiber array and the photodiode array can be arranged such that the pitches between each optical fiber of the first tier and each optical fiber of the second tier directly above the each optical fiber of the first tier, between each photodiode of the first tier and each photodiode of the second tier directly above the each photodiode of the first tier, between the eight optical fibers of each of the transmitter group and the receiver group of the fiber array, between the eight laser diodes of the transmitter group of the laser diode array, and between the eight photodiodes of each of the monitor group and the receiver group of the photodiode array are substantially equal. In addition, on a single substrate of the photodiode array, the photodiodes of the monitor group and the receiver group can be positioned adjacent to each other, and perform functions of both independent monitoring of the optical output power of each of the laser diodes 36a-36h of the transmitter group, and receiving the optical signals from the optical fibers 34i-34p of the receiver group.

As a result, the optical module according to this embodiment of the present invention can increase, within limited space, a number of channels which are provided with optical output power monitors. Moreover, according to this embodiment of the present invention, structures of an optical module can be simplified, and manufacturing cost of an optical module can be reduced.

Figure 7:
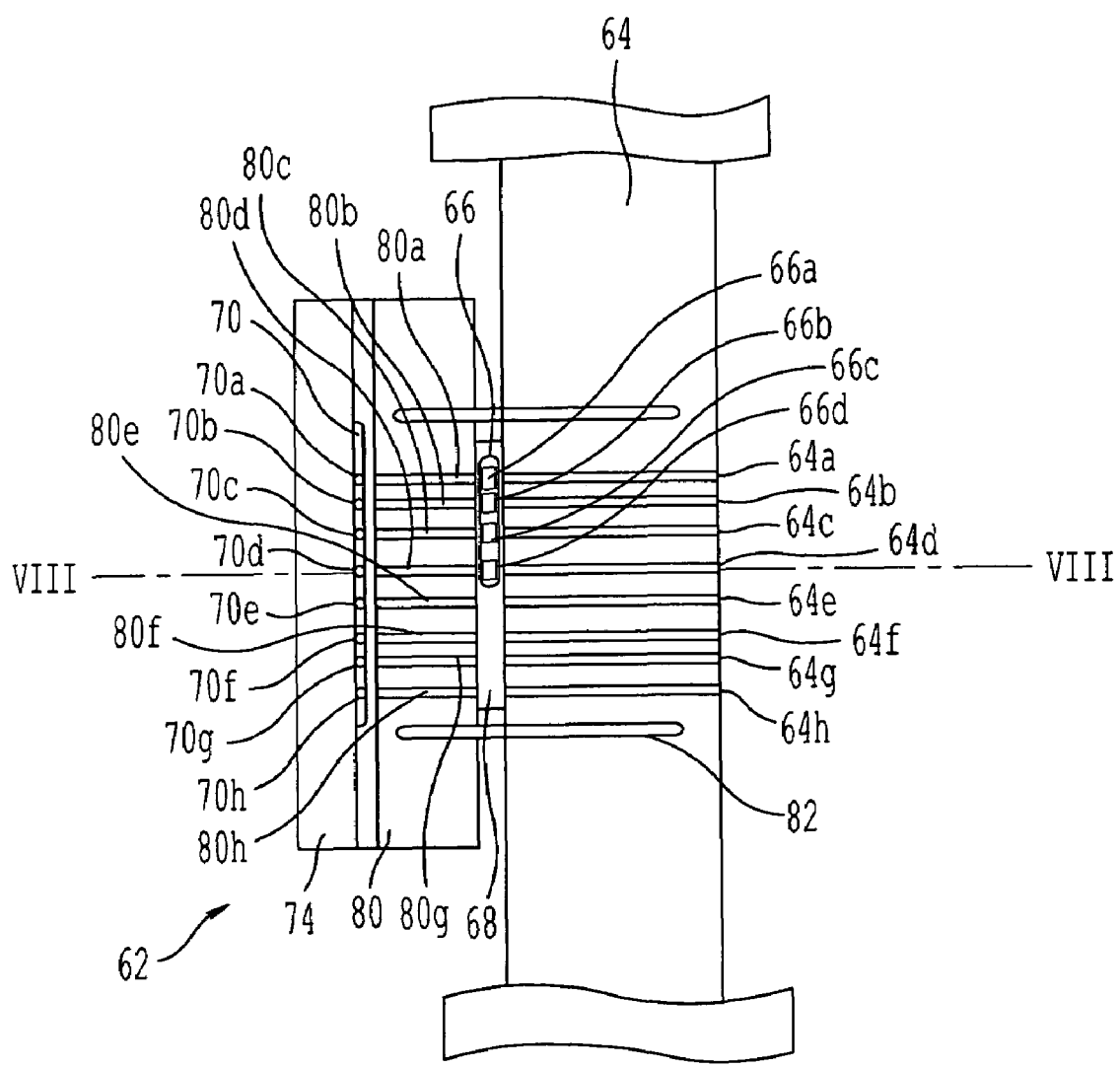
FIG. 7 is a top plan view of an optical module according to an embodiment of the present invention.
Figure 8:
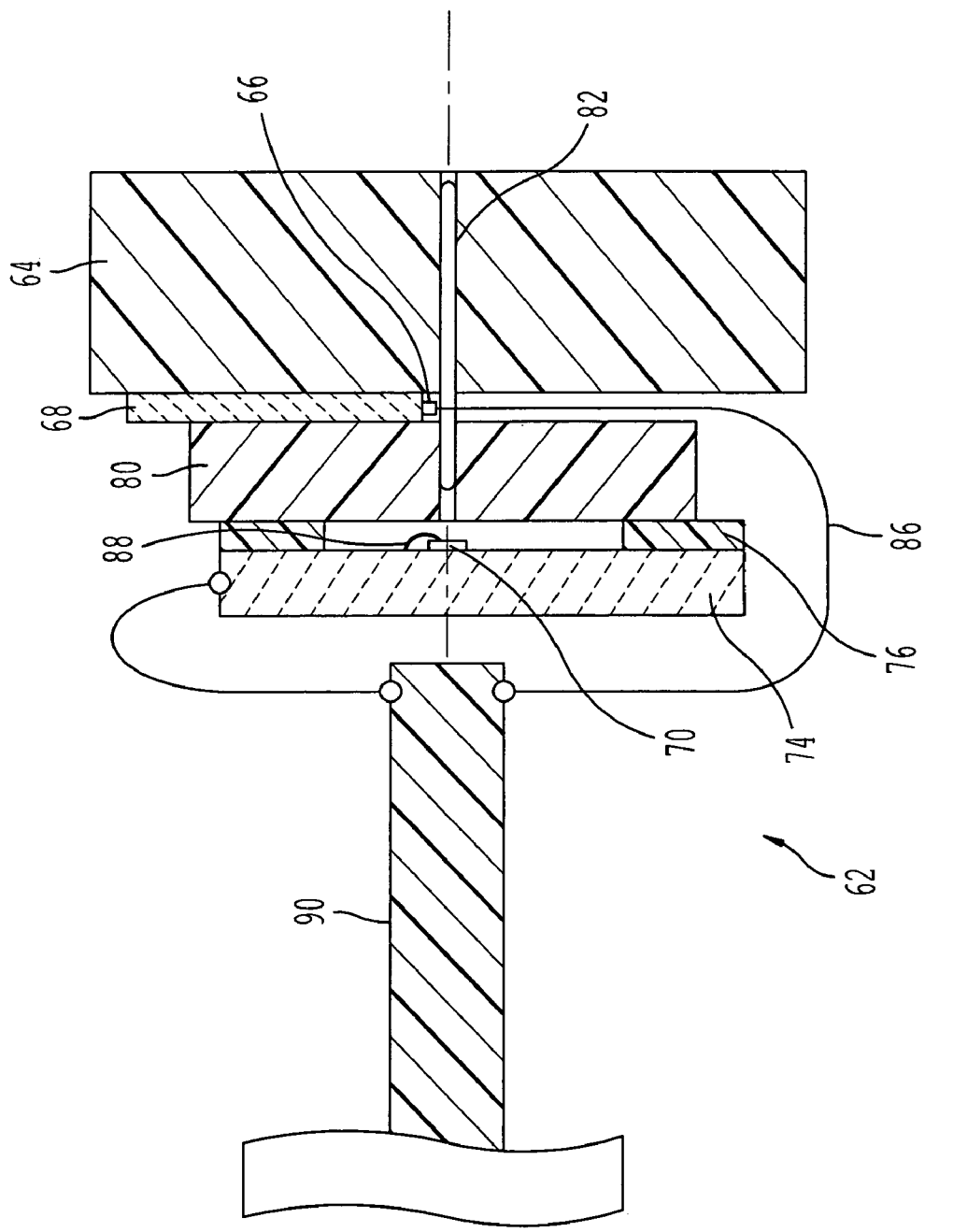
FIG. 8 is a cross sectional view of the optical module cut along the line VIII-VIII of FIG. 7.

FIGS. 7 and 8 show an optical module according to an embodiment of the present invention which includes a mechanical transfer ferrule. Referring to FIGS. 7-8, the optical module 62 includes, a multi-channel, for example, 8-channel fiber array 64, a multi-channel, for example, 4-channel laser diode array 66, a laser diode submount 68, a multi-channel, for example, 8-channel photodiode array 70, a photodiode submount 74, and the mechanical transfer ferrule 80 with plural, for example, 8 optical fibers.

The fiber array 64 and the laser diode submount 68, and the laser diode submount 68 and the mechanical transfer ferrule 80 are bonded to each other to sandwich the laser diode array 66 by the fiber array 64 and the mechanical transfer ferrule 80. In addition, the fiber array 64 and the mechanical transfer ferrule 80 are connected by two guide pins 82 to sandwich the laser diode array 66 and the laser diode submount 68. A spacer 76 is provided between the mechanical transfer ferrule 80 and the photodiode submount 74 to provide space for the photodiode array 70 which is bonded on the photodiode submount 74. A photodiode lead wire 88 connects the photodiode array 70 to electrical circuits 90 to supply electrical currents and to receive electrical signals. A laser diode lead wire 86 connects the laser diode array 66 to the electrical circuits 90 to supply electrical currents and to receive electrical signals.

The fiber array 64 includes first to fourth optical fibers 64a-64d of a transmitter group, and fifth to eighth optical fibers 64e-64h of a receiver group. The laser diode array 66 includes first to fourth laser diodes 66a-66d of a transmitter group. The photodiode array 70 includes first to fourth photodiodes 70a-70d of a monitor group, and fifth to eighth photodiodes 70e-70h of a receiver group. The mechanical transfer ferrule 80 includes first to fourth optical fibers 80a-80d of a transmitter group and fifth to eighth optical fibers 80e-80h of a receiver group.

The fiber array 64, the laser diode array 66, the mechanical transfer ferrule 80, and the photodiode array 70 are arranged such that the first to fourth optical fibers 64a-64d of the transmitter group of the fiber array, the first to fourth laser diodes 66a-66d of the transmitter group, the first to fourth optical fibers 80a-80d of the transmitter group of the mechanical transfer ferrule, and the first to fourth photodiodes 70a-70d of the monitor group are optically aligned along an optical axis direction of transmitter groups, respectively, and such that the fifth to eighth optical fibers 64e-64h of the receiver group of the fiber array, the fifth to eighth optical fibers 80e-80h of the receiver group of the mechanical transfer ferrule, and the fifth to eighth photodiodes 70e-70h of the receiver group are optically aligned along an optical axis direction of receiver groups, respectively. A length of the mechanical transfer ferrule 80 along each of the optical axis direction of transmitter groups and the optical axis direction of receiver groups is, for example, at least about 1 mm.

Here, each pair of the transmitter group and the receiver group of the fiber array, the monitor group and the receiver group of the photodiode array, and the transmitter group and the receiver group of the mechanical transfer ferrule are adjacent to each other within a respective pair. However, one or more groups of optical fibers or one or more of other components of the optical module may be provided between the transmitter group and the receiver group of the fiber array. Similarly, one or more groups of photodiodes or one or more of other components of the optical module may be provided between the monitor group and the receiver group of the photodiode array, and one or more groups of optical fibers or one or more of other components of the optical module may be provided between the transmitter group and the receiver group of the mechanical ferrule, as long as the optical fibers of the transmitter group of the fiber array, the laser diodes of the transmitter group, the optical fibers of the transmitter group of the mechanical ferrule and the photodiodes of the monitor group are optically aliened, respectively, and the optical fibers of the receiver group of the fiber array, the optical fibers of the receiver group of the mechanical ferrule and the photodiodes of the receiver group are optically aligned, respectively.

According to this embodiment of the present invention, because each of the optical fibers of the transmitter group 80a-80d and the receiver group 80e-80h of the mechanical transfer ferrule has a numerical aperture of at most about 0.21, the mechanical transfer ferrule 80 can reduce optical crosstalk between optical signals emitted from the laser diodes 66a-66d of the transmitter group to be received by the photodiodes 70a-70d of the monitor group, respectively. The mechanical transfer ferrule 80 can also reduce optical crosstalk between the laser diodes 66a-66d of the transmitter group and the optical fibers 64e-64h of the receiver group of the fiber array.

Moreover, because the mechanical transfer ferrule separates a point where the photodiode lead wire 88 is connected to the photodiode array from a point where the laser diode lead wire 86 is connected to the laser diode array, providing a distance of, for example, at least about 1 mm, electrical crosstalk between the photodiode lead wire 88 and the laser diode lead wire 86 can be reduced, thereby allowing the electrical circuits 90 to accurately receive electrical signals via the photodiode lead wire 88 and the laser diode lead wire 86.

Further, because the mechanical transfer ferrule 80 and the fiber array 64 are connected by the two guide pins 82, the mechanical transfer ferrule 80 can be precisely positioned in relation to the fiber array 64, and can also increase bonding strength between the laser diode submount 68 and the fiber array 64. Because of the two guide pins 82, the bonding strength between the laser diode submount 68 and the fiber array 64 can be increased to pass a temperature cycle test at −40° C., 85° C. and 500 cycles, and a high temperature and high humidity storage test at 85° C., 85% and 5,000 hours.

As a result, the optical module according to this embodiment of the present invention can increase, within limited space, a number of channels which are provided with optical output power monitors, and can also stabilize transmission and reception of optical signals. In addition, because use of the two guide pins increases the bonding strength between the laser diode submount and the fiber array, the optical module can be used even under an environment with either or both a high temperature and a high humidity. Moreover, structures of an optical module can be simplified, and manufacturing cost of an optical module can be reduced.

Figure 9:
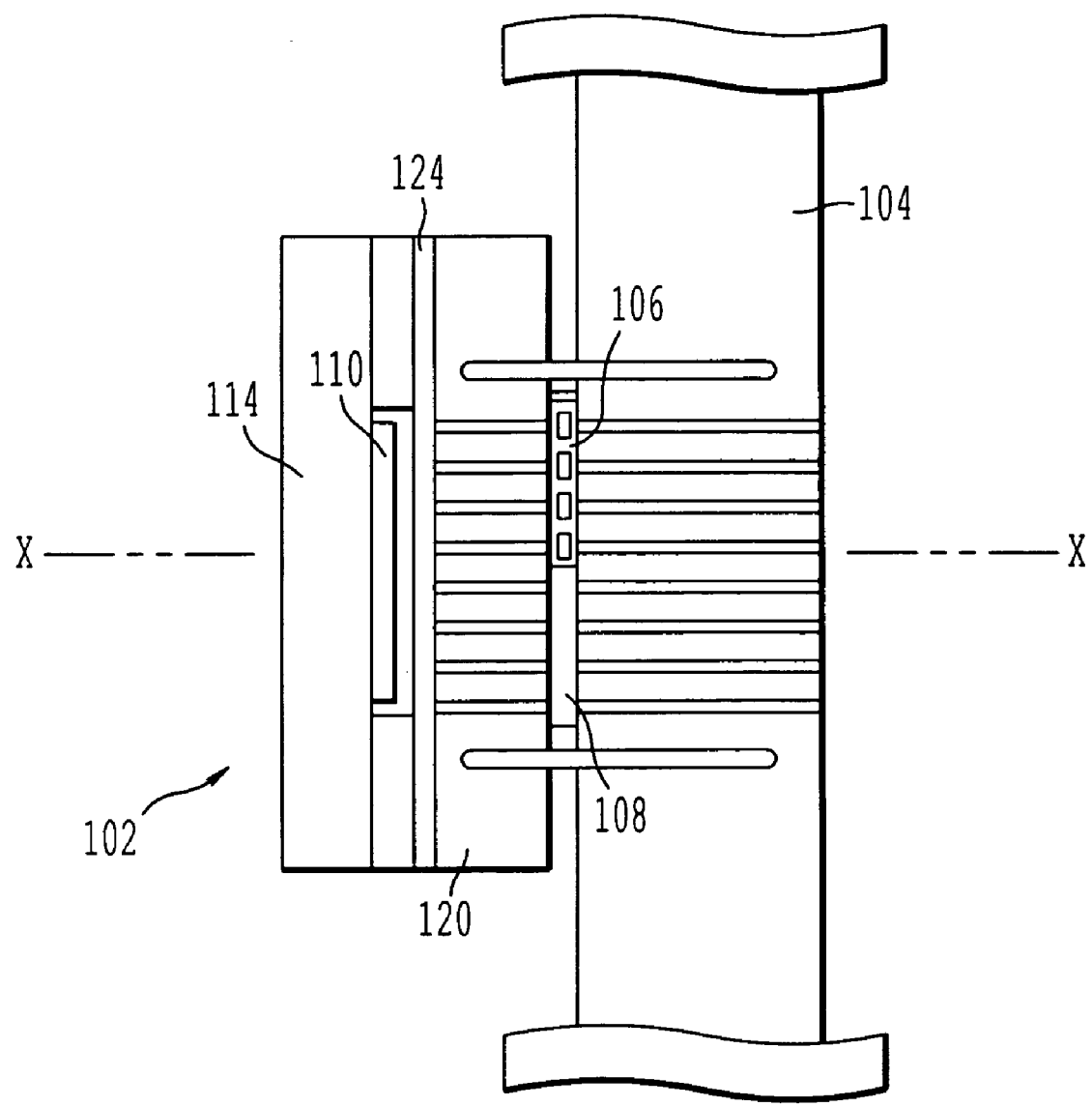
FIG. 9 is a top plan view of an optical module according to an embodiment of the present invention.
Figure 10:
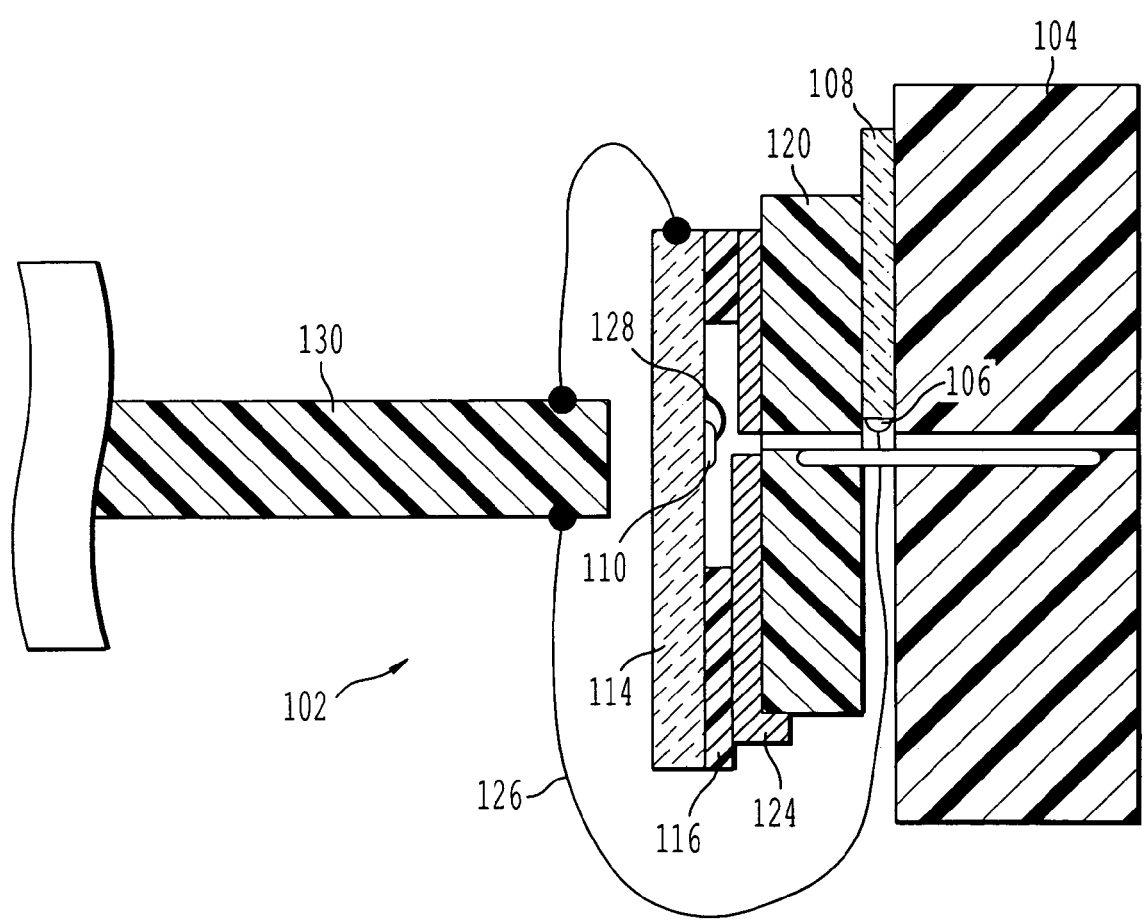
FIG. 10 is a cross sectional view of the optical module cut along the line X-X of FIG. 9.

FIGS. 9 and 10 show an optical module according to an embodiment of the present invention which includes a shield metal. Referring to FIGS. 9 and 10, the optical module 102 includes, a multi-channel, for example, 8-channel fiber array 104, a multi-channel, for example, 4-channel laser diode array 106, a laser diode submount 108, a multi-channel, for example, 8-channel photodiode array 110, a photodiode submount 114, a mechanical transfer ferrule 120 with plural, for example, 8 optical fibers, and the shield metal 124.

The shield metal 124 is provided near a photodiode lead wire 128, bonded onto a surface of the mechanical transfer ferrule 120, and sandwiched by the photodiode array 110 and the mechanical transfer ferrule 120. The shield metal 124 may be between the laser diode array 106 and the mechanical transfer ferrule 120. A laser diode lead wire 126 connects the laser diode array 106 to electrical circuits 130. The photodiode lead wire 128 connects the photodiode array 110 to the electrical circuits 130.

According to this embodiment of the present invention, the shield metal 124 prevents electrical crosstalk between the photodiode lead wire 128 and the laser diode lead wire 126, which affects the photodiode lead wire 128, thereby increasing accuracy of electrical signals which the electrical circuits 130 receive from the photodiode array 110 via the photodiode lead wire 128. In addition, the mechanical transfer ferrule 120 coated by metal or made from metal coated plastics can also prevents the electrical crosstalk between the photodiode lead wire 128 and the laser diode lead wire 126, thereby increasing the accuracy of the electrical signals which the electrical circuits 130 receive from the photodiode array 110 via the photodiode lead wire 128.

As a result, the optical module according to this embodiment of the present invention can increase, within limited space, a number of channels which are provided with optical output power monitors, and can also stabilize transmission and reception of optical signals. In addition, because use of at least one guide pin to connect the mechanical transfer ferrule and the fiber array increases bonding strength between the laser diode submount and the fiber array, the optical module can be used even under an environment with either or both a high temperature and a high humidity. Moreover, according to this embodiment of the present invention, structures of an optical module can be simplified, and manufacturing cost of an optical module can be reduced.

Figure 11:
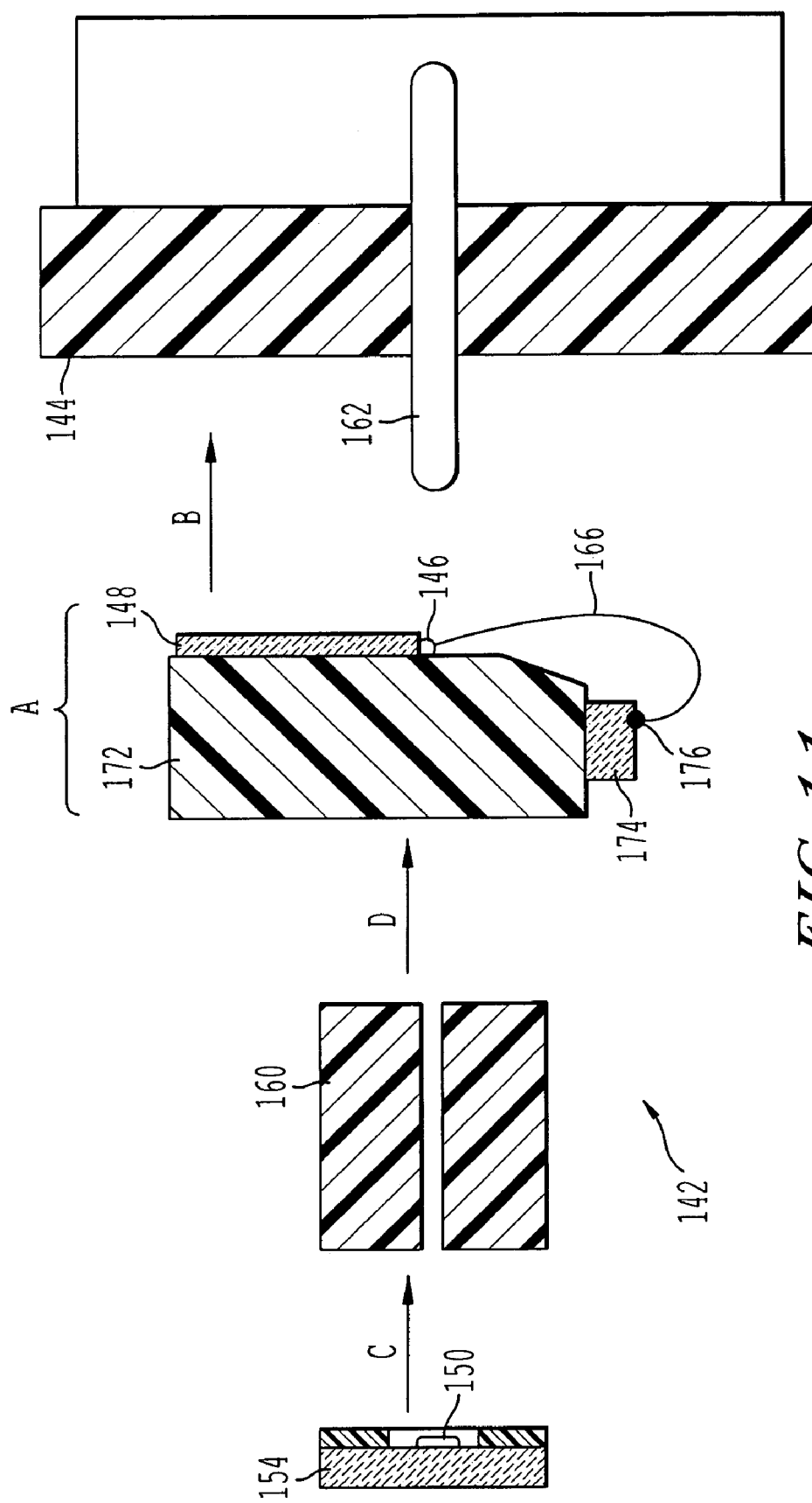
FIG. 11 is showing a method of manufacturing an optical module according to the present invention.

FIG. 11 shows a method of manufacturing an optical module according to an embodiment of the present invention which includes a bridge and a terminal block on the bridge. Referring to FIG. 11, the optical module 142 includes, a multi-channel fiber array 144, a multi-channel laser diode array 146, a laser diode submount 148, a multi-channel photodiode array 150, a photodiode submount 154, a multi-channel mechanical transfer ferrule 160, the bridge 172 and the terminal block 174.

The bridge 172 connects with the laser diode submount 148. The laser diode submount 148 has a thickness of at least about 150 μm and at most about 350 μm. The bridge 172 is provided with an opening so that optical signals transmitted from laser diodes of a transmitter group of the laser diode array 146 and from optical fibers of a receiver group of the fiber array can pass through to be received by corresponding photodiodes of a monitor group and a receiver group of the photodiode array 150, without being attenuated. The terminal block 174, which is provided on the bridge 172, has a bonding pad 176 to bond one end of a laser diode lead wire 166 to the terminal block 174. The mechanical transfer ferrule 160 is connected with the bridge 172 and the photodiode array 150 to be sandwiched by the bridge 172 and the photodiode array 150. The fiber array 144, the laser diode array 146, the mechanical transfer ferrule 160 and the photodiode array 150 are optically aligned, respectively.

According to this embodiment of the present invention, because the laser diode submount 148 is provided with the bridge 172 and the terminal block 174, the laser diode lead wire 166 can be bonded to the laser diode array 146 without a need of a special tool, even when the laser diode submount 148 is with a thickness of, for example, about 150 μm. As a result, the optical module according to this embodiment of the present invention can reduce manufacturing cost.

In the manufacturing of the optical module according to the present invention, in a process A, the laser diode submount 148, on which the laser diode array 146 is provided, is positioned on the bridge 172, on which the terminal block 174 is provided. Then, one end of the laser diode lead wire 166 is bonded to the laser diode array 146 and another end of the laser diode lead wire 166 to the bonding pad 176 of the terminal block 174.

In a process B, each optical fiber of a transmitter group of the fiber array 144 is optically aligned with each corresponding laser diode of the transmitter group of the laser diode array 146. Then, the fiber array 144 is bonded to the laser diode submount 148 with the laser diode array 146, which is positioned on the bridge 172 during the process A.

In a process C, each optical fiber of a transmitter group and a receiver group of the mechanical transfer ferrule 160 is optically aligned with each corresponding photodiode of the monitor group and the receiver group of the photodiode array 150. Then, the mechanical transfer ferrule 160 is bonded to the photodiode submount 154 with the photodiode array 150.

In a process D, the mechanical transfer ferrule 160, onto which the photodiode submount 154 is bonded during the process C, is connected with the fiber array 144, onto which the laser diode submount 148 is bonded during the process B, using at least one guide pin 162, such that each optical fiber of the transmitter group of the fiber array, each laser diode of the transmitter group, each optical fiber of the transmitter group of the mechanical transfer ferrule and each photodiode of the monitor group are optically aligned, respectively, and such that each optical fiber of the receiver group of the fiber array, each optical fiber of the receiver group of the mechanical transfer ferrule and each photodiode of the receiver group are optically aligned, respectively.

According to this method of manufacturing an optical module of the present invention, because the laser diode submount 148 is provided with the bridge 172 and the terminal block 174, the laser diode lead wire 166 can be bonded to the laser diode array 146 without a need of a special tool, even when the laser diode submount 148 is with a thickness of, for example, about 150 μm. As a result, the optical module according to this embodiment of the present invention can reduce manufacturing cost.

Figure 12:
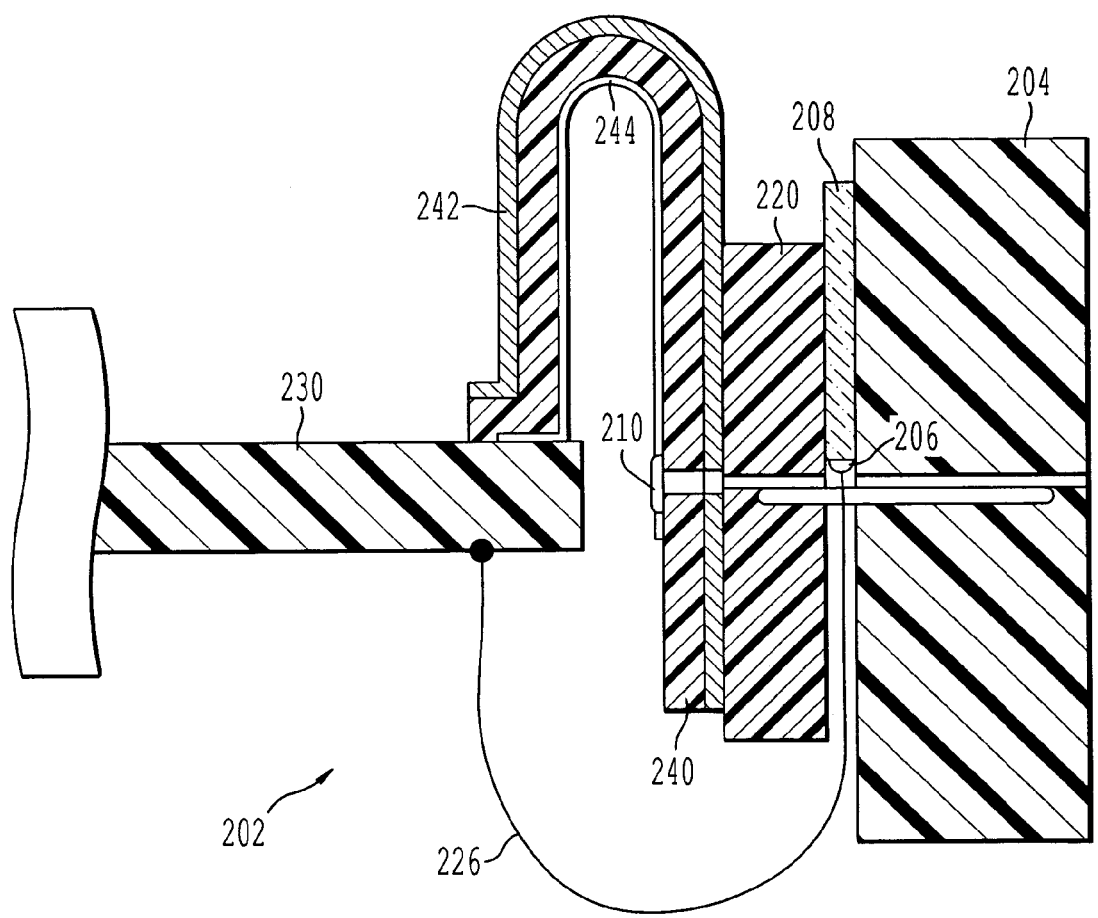
FIG. 12 is a side view of an optical module according to an embodiment of the present invention.

FIG. 12 shows an optical module according to an embodiment of the present invention which includes a flexible cable. Referring to FIG. 12, the optical module 202 includes a multi-channel fiber array 204, a multi-channel laser diode array 206, a laser diode submount 208, a multi-channel photodiode array 210, a mechanical transfer ferrule 220, and the flexible cable 240.

The flexible cable 240, which replaces a photodiode submount, is provided with a shield metal layer 242 on one side, and a trace photodiode 244 on an opposite side to the side with the shield metal layer 242. The trace photodiode 244 has an opening through which optical signals, emitted by laser diodes of the laser diode array 206 and by optical fibers of the fiber array 204, can pass to be received by corresponding photodiodes of the photodiode array 210, without being attenuated. The shield metal layer 242 of the flexible cable is positioned so that electrical crosstalk between a laser diode lead wire 226 and the trace photodiode 244 is prevented.

According to this embodiment of the present invention, the flexible cable 240 includes functions of a photodiode submount, a spacer between the laser diode array 206 and the photodiode array 210 or between the photodiode array 210 and a shield metal, a shield metal between the laser diode array 206 and the photodiode array 210, and a photodiode lead wire which connects the photodiode array 210 to electrical circuits 230.

As a result, the optical module according to this embodiment of the present invention can be manufactured with fewer parts, can increase within limited space a number of channels which are provided with optical output power monitors, and can also stabilize transmission and reception of optical signals. In addition, because use of at least one guide pin to connect the mechanical transfer ferrule and the fiber array increases bonding strength between the laser diode submount and the fiber array, the optical module can be used even under an environment with either or both a high temperature and a high humidity. Moreover, according to this embodiment of the present invention, structures of an optical module can be simplified, and manufacturing cost of an optical module can be reduced.

Figure 13:
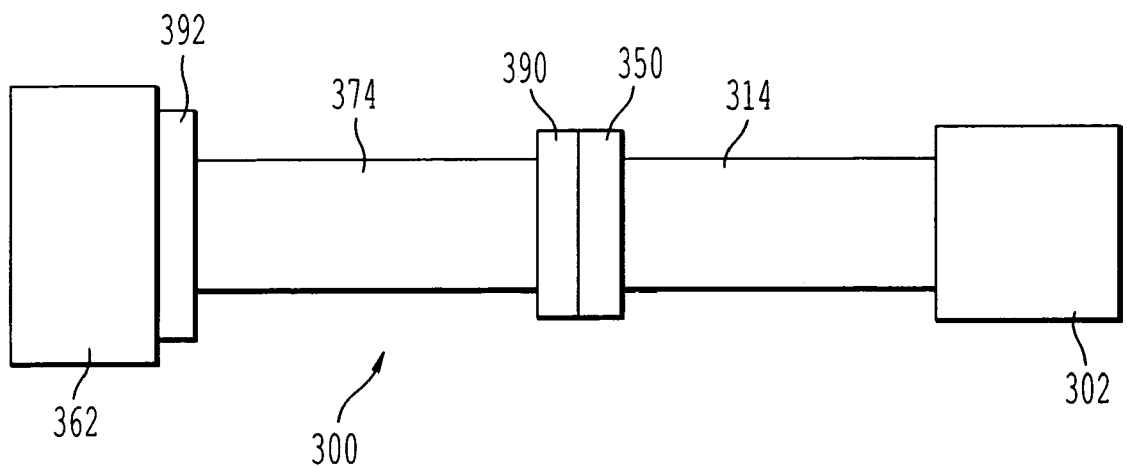
FIG. 13 is showing a data communication system according to an embodiment of the present invention.

FIG. 13 shows a data communication system according to an embodiment of the present invention. Referring to FIG. 13, the data communication system 300 includes at least one optical module 302, which is, for example, an optical module shown in FIGS. 1-3. Fiber ends 350 of a fiber array 314 of the optical module 302 are connected to fiber ends 390 of a communication fiber array 374. Another fiber ends 392 of the communication fiber array 374 are connected to a data communication module 362. The data communication system 300 according to this embodiment of the present invention may include other optical modules shown in FIGS. 4-6, FIGS. 7-8, FIGS. 9-10, FIG. 11 and FIG. 12. The data communication system 300 may be, for example, an intermediate optical fiber communication system or a part of the intermediate optical fiber communication system. A service provider of the intermediate optical fiber communication system, which has many individual subscribers, may be required to carry, for example, one thousand of multichannel optical modules at a node of a base station of the service provider. According to this embodiment of the present invention, because the optical module 302 can increase, within limited space, a number of channels to transmit and receive information, a size of the data communication system 300 can be decreased. The data communication system 300 can also be at least a part of, for example, a satellite communication system, a telecommunication system, a visual image communication system or a computer data communication system.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical module comprising:
    a fiber array including plural optical fibers which are divided to at least a transmitter group and a receiver group;
    a laser diode array including plural laser diode which are grouped in at least a transmitter group;
    a photodiode array including plural photodiodes which are divided to at least a monitor group and a receiver group, the laser diode array being provided between the fiber array and the photodiode array such that each of end surfaces of the plural optical fibers of the transmitter group faces each of the plural laser diodes of the transmitter group, each of the plural optical fibers of the transmitter group, each of the plural laser diodes of the transmitter group and each of the plural photodiodes of the monitor group being optically aligned, respectively, and each of the plural optical fibers of the receiver group being optically aligned with each of the plural photodiodes of the receiver group, respectively; and
    a spacer provided between the laser diode array and the photodiode array to tilt the photodiode array.

2. The optical module according to claim 1, wherein the plural optical fibers of each of the transmitter group and the receiver group, the plural laser diodes of the transmitter group, and the plural photodiodes of each of the transmitter group and the receiver group have substantially equal pitches.

3. The optical module according to claim 2, wherein the pitches of the plural optical fibers of the transmitter group and the plural optical fibers of the receiver group are at least about 125 μm.

4. The optical module according to claim 1, wherein a combined number of the plural optical fibers of the transmitter group and the receiver group is equal to a combined number of the plural photodiodes of the monitor group and the receiver group, and twice a number of the plural laser diodes of the transmitter group.

5. The optical module according to claim 4, wherein the plural optical fibers of the fiber array are equally divided to the transmitter group and the receiver group, and the plural photodiodes of the photodiode array are equally divided to the monitor group and the receiver group.

6. The optical module according to claim 1, wherein the transmitter group and the receiver group of the fiber array are adjacent to each other, and the monitor group and the receiver group of the photodiode array are adjacent to each other.

7. The optical module according to claim 1, wherein a distance between each of the end surfaces of the plural optical fibers of the transmitter group and each corresponding one of the plural laser diodes of the transmitter group is at least about 10 μm and at most about 50 μm.

8. The optical module according to claim 7, wherein a distance between each of the end surfaces of the plural optical fibers of the transmitter group and each corresponding one of the plural laser diodes of the transmitter group is at least about 20 μm and at most about 30 μm.

9. The optical module according to claim 1, wherein a distance between each of the plural laser diodes of the transmitter group and each corresponding one of the plural photodiodes of the monitor group is at least about 20 μm and at most about 100 μm.

10. The optical module according to claim 1, wherein a distance between each of end surfaces of the plural optical fibers of the receiver group and each corresponding one of the plural photodiodes of the receiver group is at least about 170 μm and at most about 450 μm.

11. The optical module according to claim 1, wherein the fiber array has a single tier including a first part and a second part, plural optical fibers provided in the first part are in the transmitter group, plural optical fibers provided in the second part are in the receiver group, the photodiode array has a single tier including a first part and a second part, plural photodiodes provided in the first part are in the monitor group, and plural photodiodes provided in the second part are in the receiver group.

* * * * *